US012221920B1

(12) United States Patent
Kleindienst

(10) Patent No.: US 12,221,920 B1
(45) Date of Patent: Feb. 11, 2025

(54) CAM FOLLOWING SYSTEM FOR PURSING PISTON ENGINE

(71) Applicant: John Edward Kleindienst, Dagsboro, DE (US)

(72) Inventor: John Edward Kleindienst, Dagsboro, DE (US)

( * ) Notice: Subject to any disclaimer, the term of this patent is extended or adjusted under 35 U.S.C. 154(b) by 0 days.

(21) Appl. No.: 18/789,366

(22) Filed: Jul. 30, 2024

Related U.S. Application Data

(60) Provisional application No. 63/567,253, filed on Mar. 19, 2024.

(51) Int. Cl.
*F02B 53/12* (2006.01)
*F01C 1/063* (2006.01)
*F01C 21/08* (2006.01)
*F02B 75/28* (2006.01)

(52) U.S. Cl.
CPC .............. *F02B 53/12* (2013.01); *F01C 1/063* (2013.01); *F01C 21/0809* (2013.01); *F02B 75/28* (2013.01)

(58) Field of Classification Search
CPC .. F01C 1/063; F01C 1/22; F01C 21/08; F01C 21/0809; F01C 21/0881; F02B 75/28; F02B 53/12
See application file for complete search history.

(56) References Cited

U.S. PATENT DOCUMENTS 9,719,350 B2 * 8/2017 Hicks ...................... F01C 21/18
2011/0185998 A1 * 8/2011 Murphy .................... F01C 9/00
123/18 A

FOREIGN PATENT DOCUMENTS

WO WO-2016145440 A1 * 9/2016 .............. F01C 1/063

* cited by examiner

*Primary Examiner* — Ngoc T Nguyen

(57) ABSTRACT

The present invention is a constantly rotating power piston in a ring chamber that is followed by a compression piston, stopping, and restarting. Cams on the power shaft on the inner diameter of the engine, followers and a connecting rod are utilized to adjust the separation between the power piston and compression piston. The proper location of the ring air inlets, the exhausts, the fuel introductions, and the sparks complete the engine.

20 Claims, 11 Drawing Sheets

CAM FOLLOWING SYSTEM FOR PURSING PISTON ENGINE

FIELD OF THE INVENTION

The present invention relates generally to heat engines. More specifically, the present invention is a cam following system for a pursing piston engine.

BACKGROUND OF THE INVENTION

Piston engine concepts similar to the present invention have existed for some time. For various reasons, these concepts exist in theory but have been unable to work successfully. The present invention utilizes new innovations in order to make this underlying idea work.

DETAIL DESCRIPTIONS OF THE INVENTION

Figure 1:
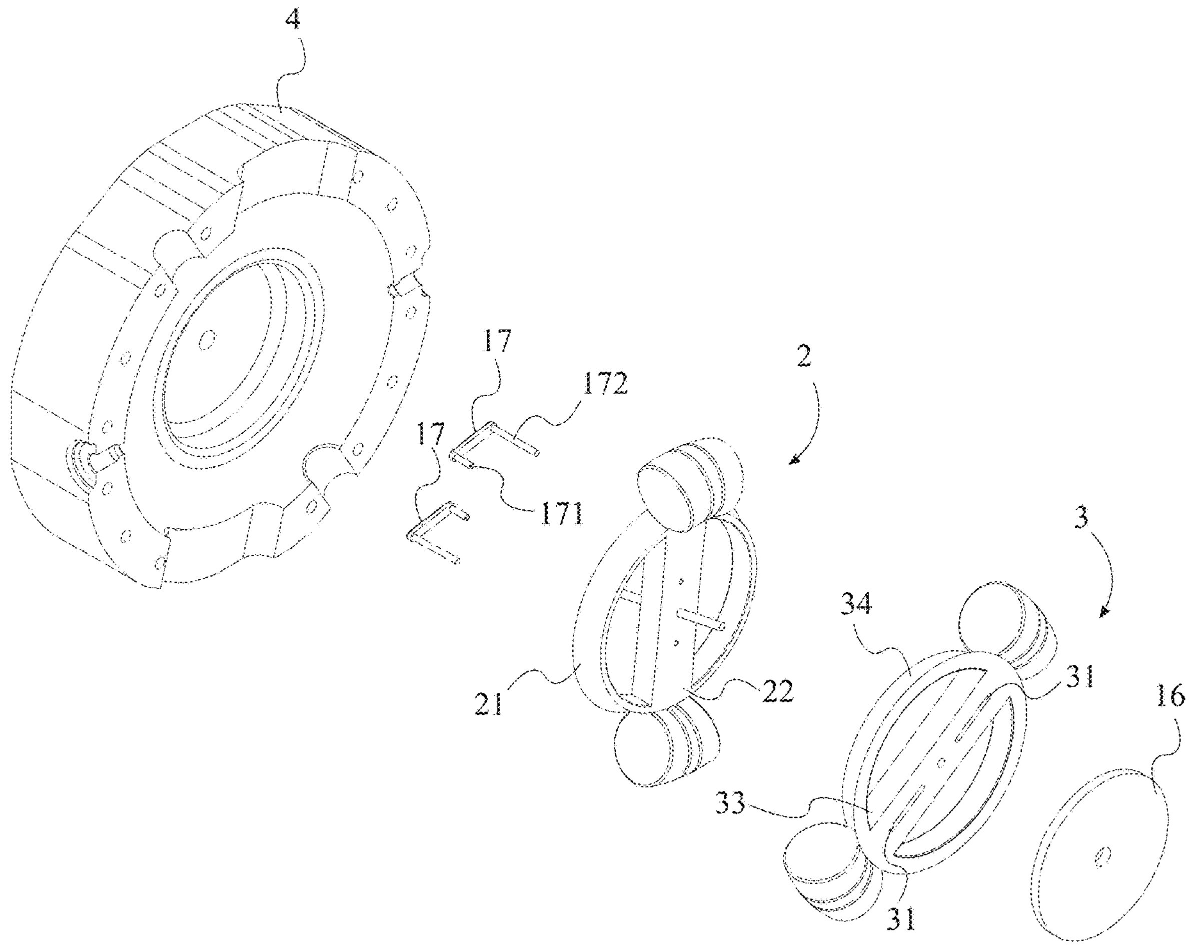
FIG. 1 is a top front right exploded perspective view of the present invention.

All illustrations of the drawings are for the purpose of describing selected versions of the present invention and are not intended to limit the scope of the present invention.

The present invention utilizes a cam 16 and follower system in a pursing piston engine, cat and mouse engine, rotary engine, or toroidal engine. A cam and follower system is used to control the relationship of a compression piston 3 in reference to a power piston 2. This relationship allows the compression piston 3 to be controlled for optimum distance control from the power piston 2 while the power piston 2 harvests the energy produced in a smooth and consistent manner. The present invention comprises a rotating power piston 2 in a ring chamber 1, a compression piston 3, a plurality of ring air inlets 11, a plurality of exhausts 12, a plurality of fuel introductions 13, a plurality of ignition sparks 14, a cam 16, and a plurality of slots 31 with two slots, a plurality of followers 17, an engine casting, and a connecting rod 32.

A constantly rotating power piston 2 in a ring chamber 1 is followed by a compression piston 3, stopping and restarting. By use of the cam 16 on the power shaft on the inner diameter of the engine, a plurality of followers 17 and connecting rod 32 adjusts the separation between the power piston 2 and compression piston 3. Proper location of the plurality of ring air inlets 11, the plurality of exhausts 12, the plurality of fuel introductions 13 and the plurality of ignition sparks 14 complete the engine.

In reference to FIG. 1-11, the present invention comprises a ring chamber 1, a power piston 2, and a compression piston 3. The ring chamber 1 comprises a plurality of ring air inlets 11, a plurality of exhausts 12, a plurality of fuel introductions 13, a plurality of ignition sparks 14, a cam 16, and a plurality of followers 17. The power piston 2 comprises a power ring 21 and a power rod. The compression piston 3 comprises a plurality of slots 31, a connecting rod 32, a compression arm 33, and a compression ring 34. The power piston 2 and compression piston 3 is fitted within the ring chamber 1. Accordingly, the power piston 2 and compression piston 3 create a sealed area within the ring chamber 1. The power piston 2 and compression piston 3 rotates in a circular motion around the connecting rod 32 wherein the power piston 2 is secured to the connecting rod 32. Consequently, the power piston 2 and compression piston 3 rotate in a circular manner. The power piston 2 mechanically couples to the compression piston 3 wherein the compression piston 3 is less mass than the power piston 2. As a result, the compression piston 3 follows the motion of the power piston 2, with a controlled distance between the two pistons. The compression piston 3 compresses a fuel mixture within the ring chamber 1. Thus, the fuel mixture is compressed to continue the engine firing process. The plurality of ignition sparks 14 ignites the compressed fuel mixture within the ring chamber 1. So, the compressed fuel mixture produces a rotating force with the power piston 2.

Figure 3:
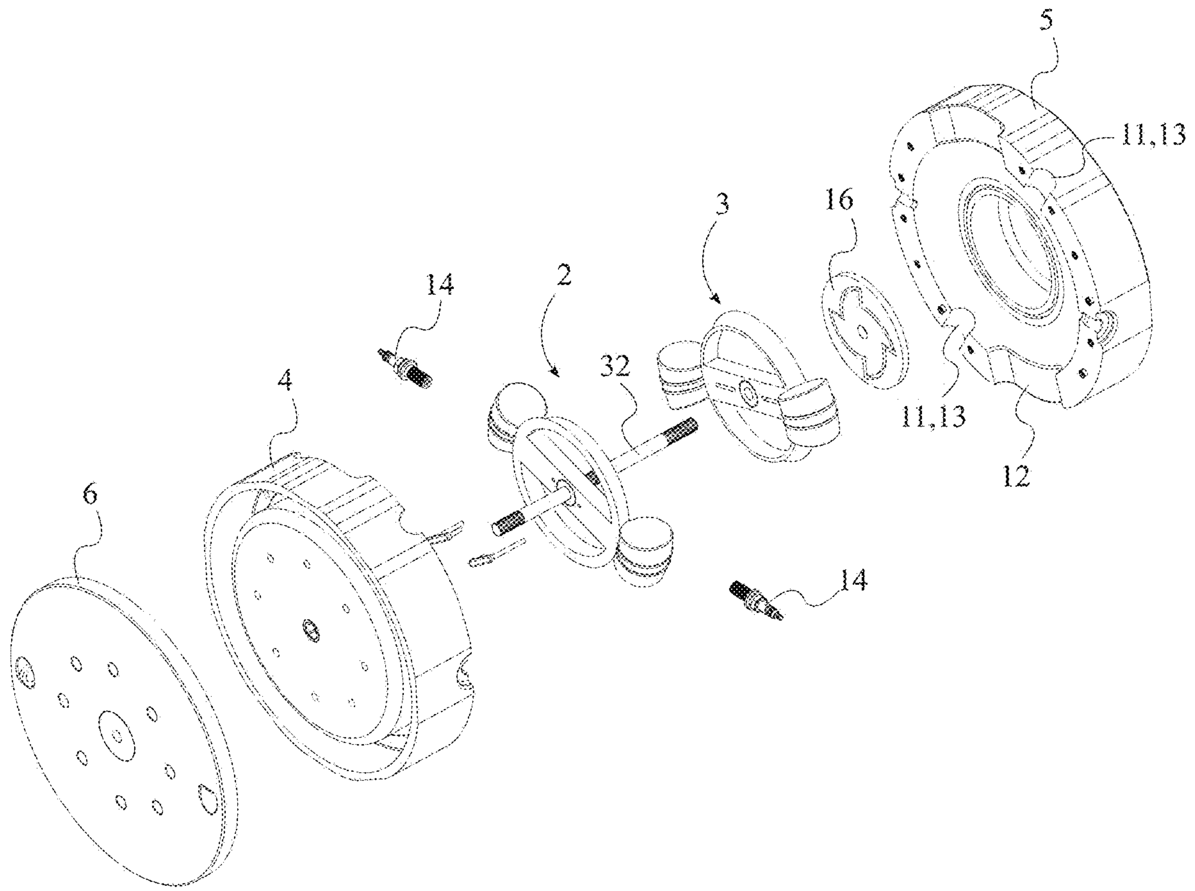
FIG. 3 is a top front left exploded perspective view of the present invention with an elongated connecting rod, gear housing rear and front cover shown.
Figure 4:
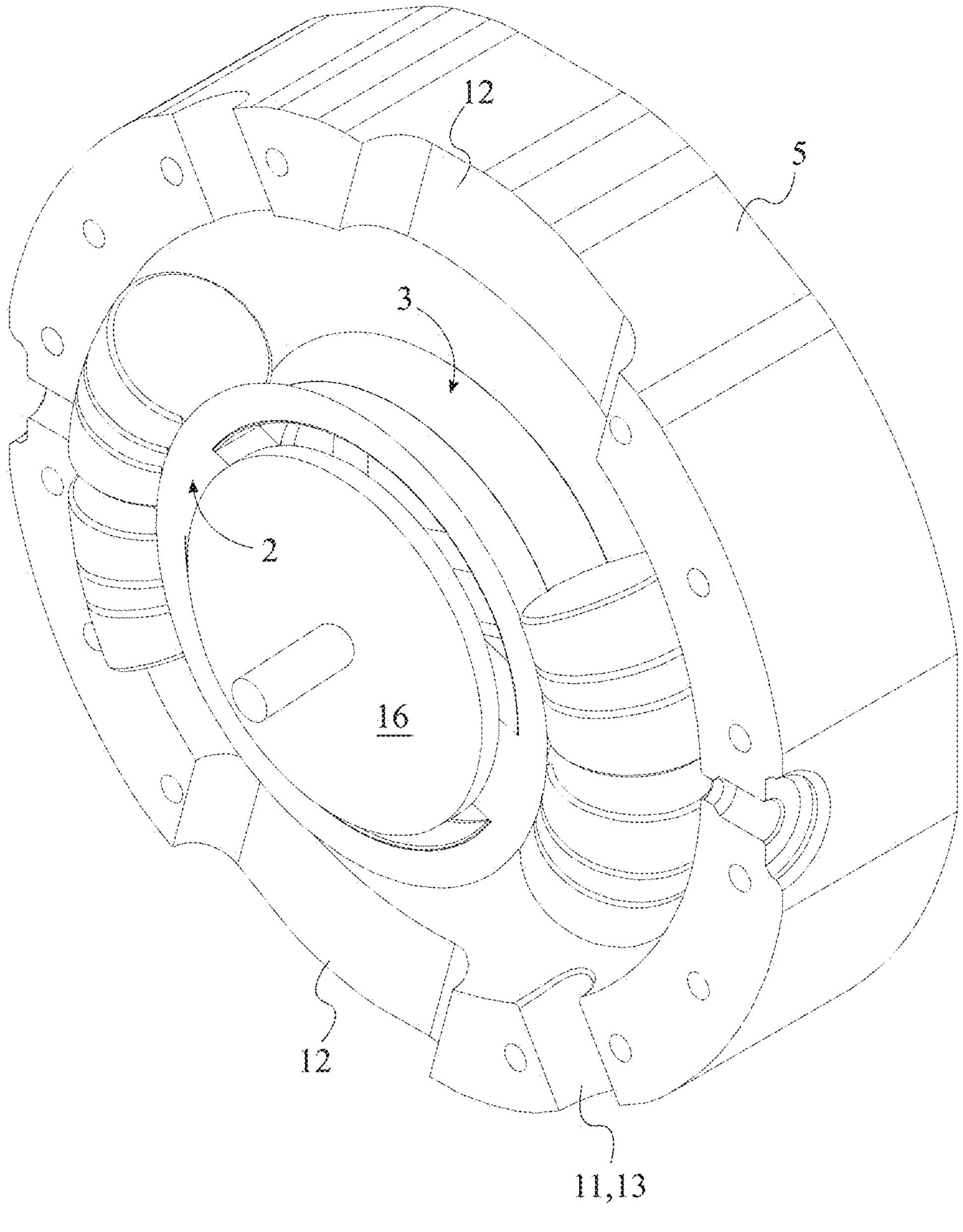
FIG. 4 is a top front left perspective view of the present invention.
Figure 5:
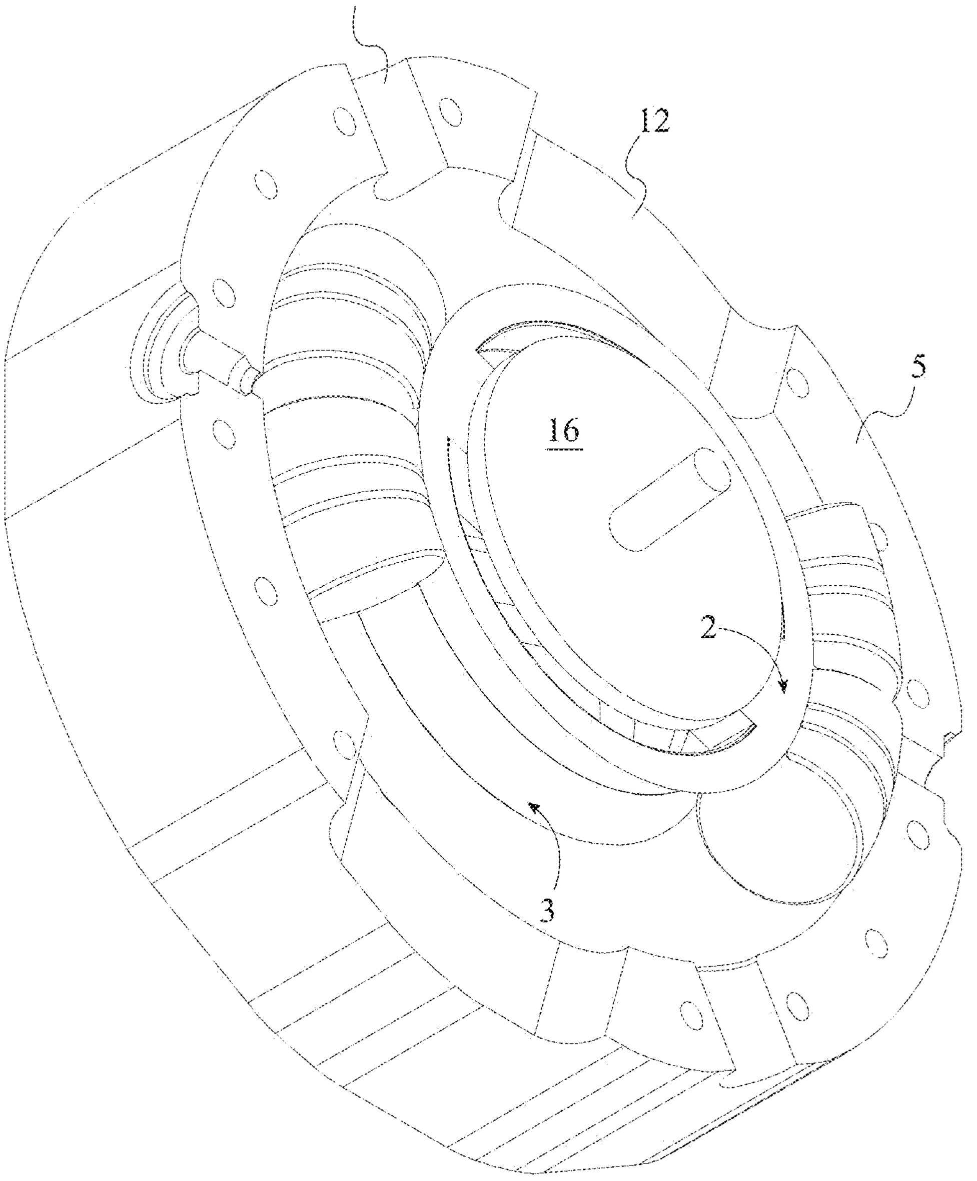
FIG. 5 is a bottom front right perspective view of the present invention.
Figure 6:
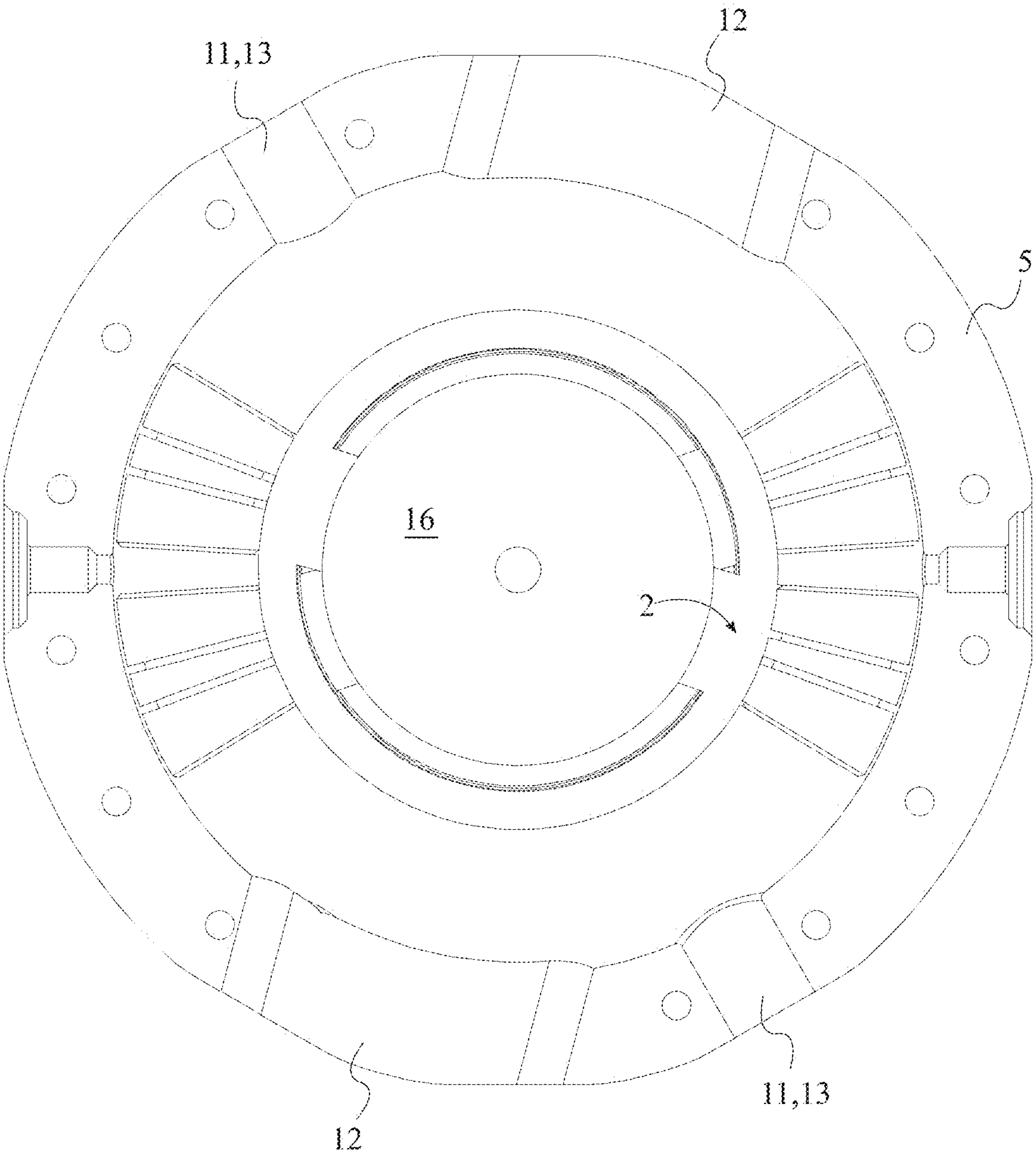
FIG. 6 is a front view of the present invention.
Figure 7:
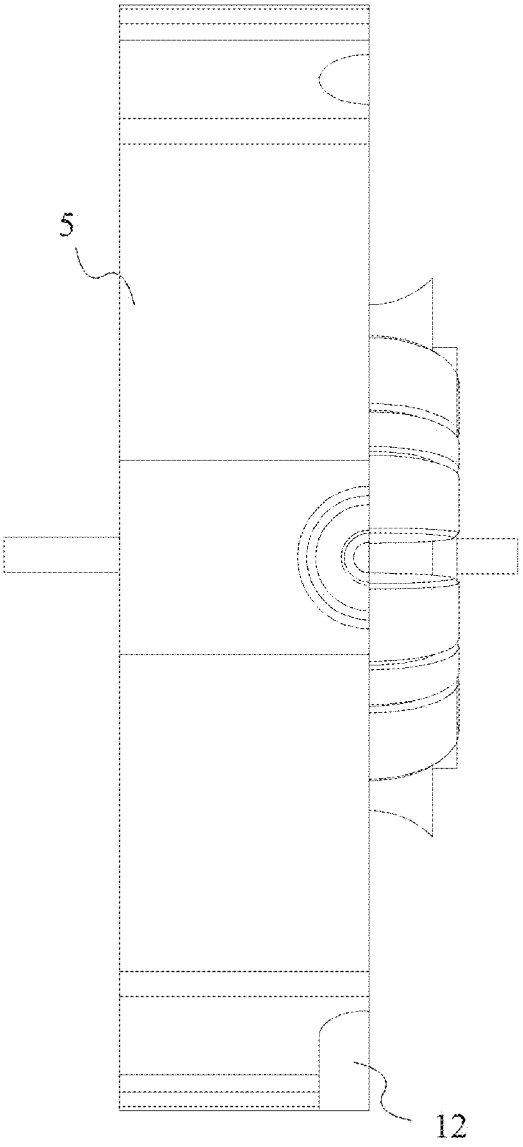
FIG. 7 is a right-side view of the present invention.

In reference to FIG. 3, the plurality of ring air inlets 11 feeds air into the ring chamber 1 in-between the power piston 2 and compression piston 3. Accordingly, air is fed into the ring chamber 1. The plurality of fuel introductions 13 feeds fuel into the ring chamber 1 in-between the power piston 2 and compression piston 3. Consequently, the fuel is introduced into the ring chamber 1 at the same position A when the air is introduced to the ring chamber 1. The air and fuel forms a fuel mixture within the ring chamber 1. As a result, the fuel mixture is optimized for the engine firing process. The plurality of ring air inlets 11 and plurality of fuel introductions 13 integrates along the outer circumference of the ring chamber 1. Thus, the air and fuel can be introduced into the ring chamber 1 and sealed off from the outer environment.

Figure 9:
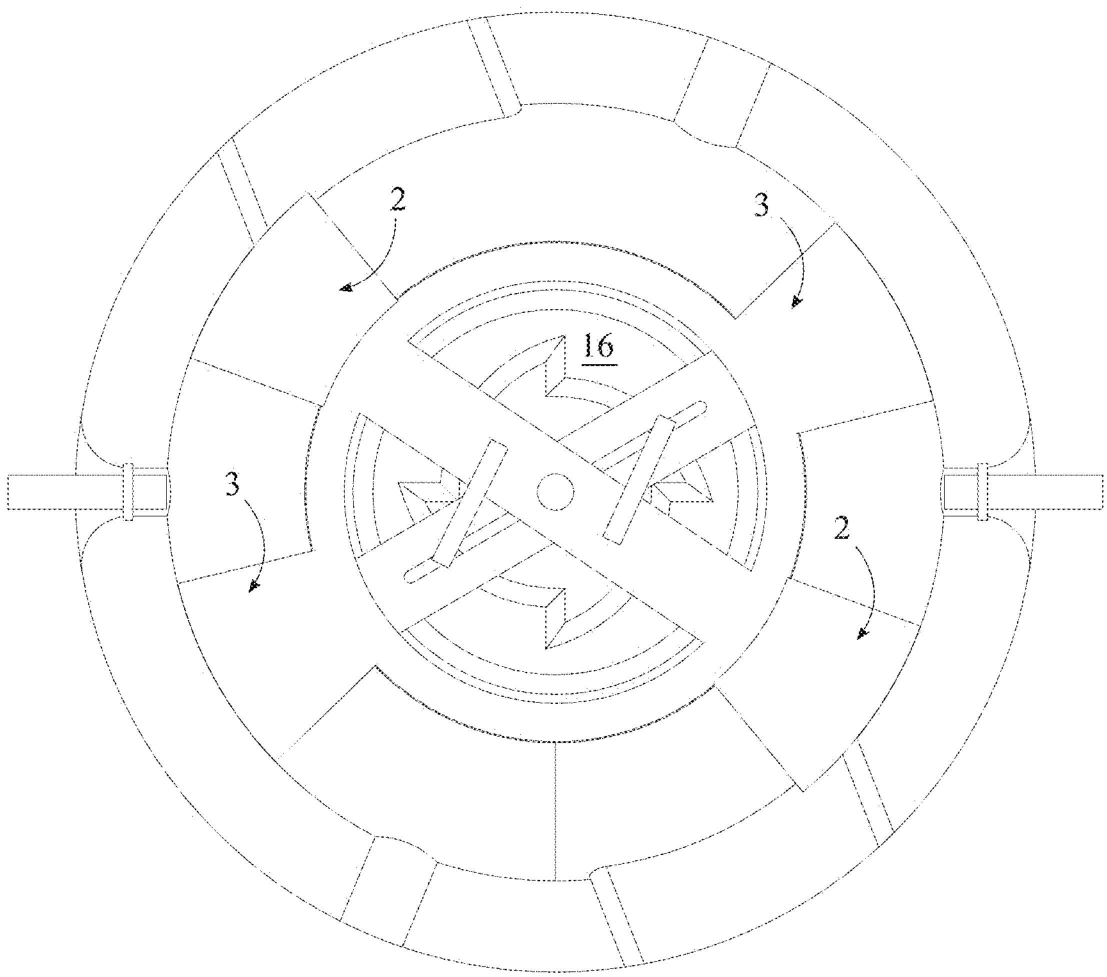
FIG. 9 is an illustration of the present invention showing position B.

Further, the plurality of ignition sparks 14 ignites the fuel mixture within the ring chamber 1. So, the fuel mixture produces a force once ignited. The fuel mixture rotates the power piston 2. Accordingly, the power piston 2 is pushed along the ring chamber 1 into a new position B as seen in FIG. 9. The fuel mixture exits the ring chamber 1 at the plurality of exhausts 12. Consequently, the fuel mixture, after igniting and pushing the power piston 2 to position B, leaves the ring chamber 1 to allow for a new fuel mixture to enter the ring chamber 1, wherein the engine firing process repeats. The plurality of ignition sparks 14 and the plurality of exhausts 12 integrates along the outer circumference of the ring chamber 1. As a result, the fuel mixture can easily exit the ring chamber 1 and a spark can reach into and ignite a new fuel mixture.

Figure 2:
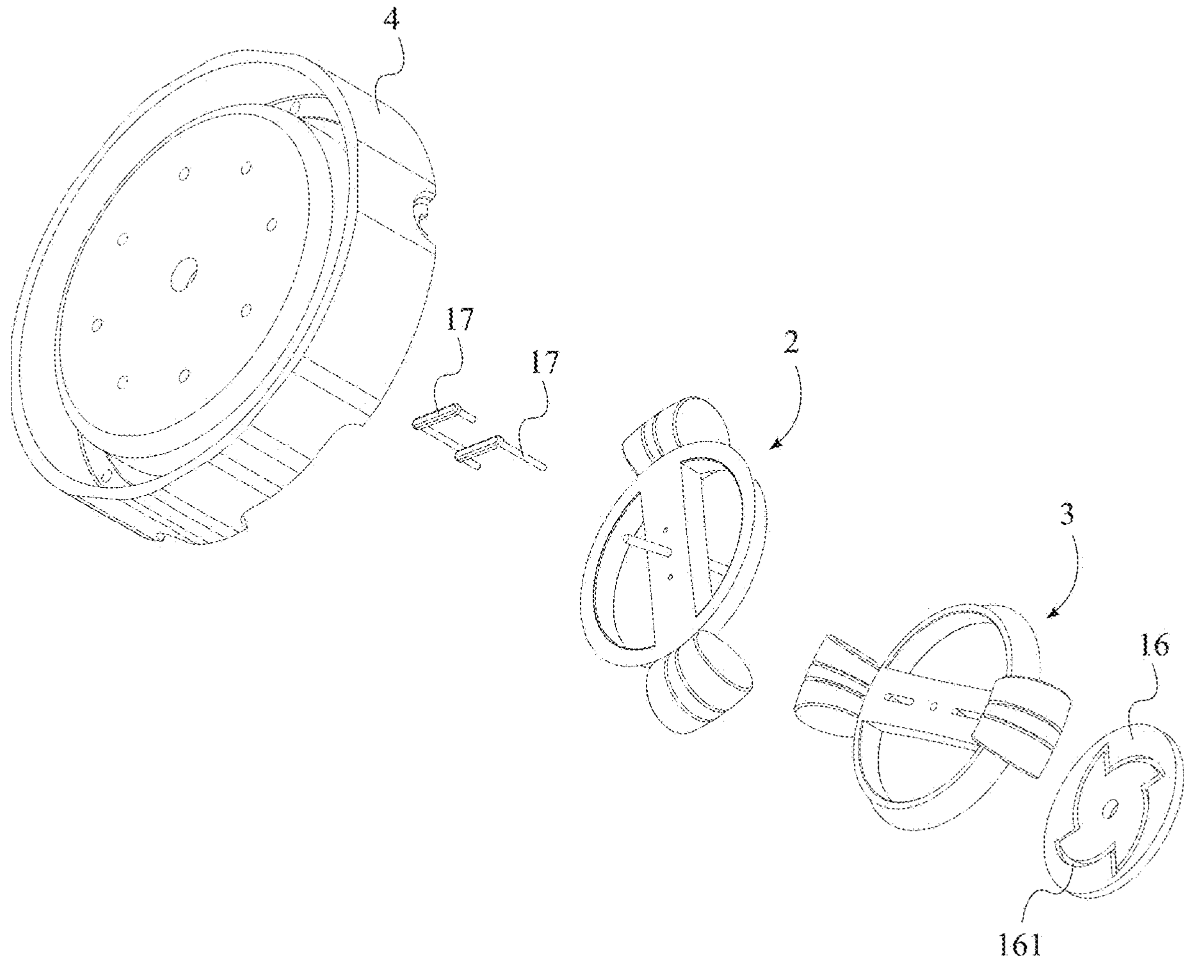
FIG. 2 is a bottom rear right exploded perspective view of the present invention.

In reference to FIG. 2, the cam 16 maintains proper distance between the power piston 2 and compression piston 3 throughout the engine firing. Thus, this design ensures the distance between the power piston 2 and the compression piston 3 is optimal throughout the engine firing process. The cam 16 further comprises a guide member 161. The guide member 161 provides a channel, slot, protrusion, ledge, ridge, or lip to control the vertical motion of a mechanically coupled piece.

Figure 8:
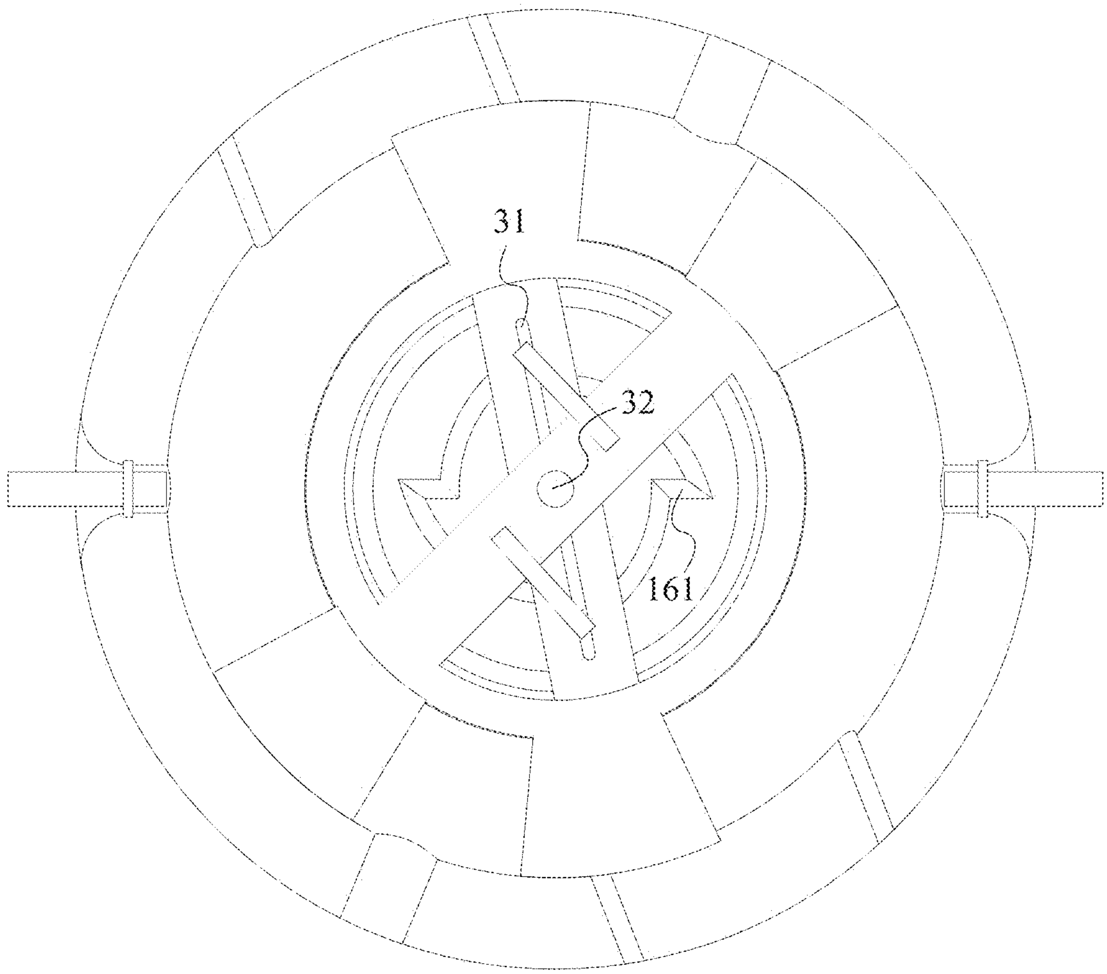
FIG. 8 is an illustration of the present invention showing position A.

Further, the plurality of followers 17 mechanically couples the power piston 2 and compression piston 3 to the cam 16. Accordingly, the power piston 2 and compression piston 3 motion are controlled by the cam 16. The plurality of followers 17 comprises a top end 171 and a bottom end 172. The top and bottom end 172 being cylindrical members that extend into the ring chamber 1 through the power piston 2 and compression piston 3. The top end 171 is pivotally pinned to the power piston 2 as seen in FIG. 8. In an alternative embodiment a dual slot is possible to receive the plurality of followers 17. Consequently, the plurality of followers 17 rotates around the pinned point along the power piston 2. The bottom end 172 is mechanically coupled to the cam 16. The bottom end 172 traverses through the guide member 161 configuration along the cam 16. As a result, the bottom end 172 moves the compression piston 3 along the guide member 161 of the cam 16 and maintains a proper distance between the power piston 2 and compression piston 3.

In reference to FIG. 1, the power ring 21 forms a circular shape that fits within the ring chamber 1. The power arm 22 connects one end of the power piston 2 to the other end. Thus, the power arm 22 ensures that the power pistons 2 are on opposite sides of the ring chamber 1. The power piston 2 and compression piston 3 can be designed with a round, square, triangular or other similar shape that would allow for compression of the fuel mixture.

Further, the compression ring 34 forms a circular shape that fits within the ring chamber 1 shown in FIG. 1. The compression arm 33 connects one end of the compression piston 3 to the other end. So, the compression arm 33 ensures that the compression pistons 3 are on opposite sides of the ring chamber 1. The power ring 21 receives the compression ring 34. Accordingly, the compression ring 34 is mechanically coupled to the power ring 21 and allows for each ring to rotate in place along the other ring. The motion of the compression piston 3 allows for pressure to exhaust, creates a vacuum for intake, and provides compression and a back stop for ignition.

Furthermore, the connecting rod 32 traverses through the compression arm 33 through the power arm 22. Consequently, the connecting rod 32 provides a pivot point for the compression arm 33 and power arm 22 to rotate around. The plurality of slots 31 integrates along the compression arm 33. The plurality of slots 31 is two linear slots positioned on either side of the connecting rod 32 as seen in FIG. 1. The plurality of followers 17 traverses through the plurality of slots 31. As a result, the plurality of followers 17 moves along the plurality of slots 31. The plurality of slots 31 constrains the movement of the plurality of followers 17.

Figure 10:
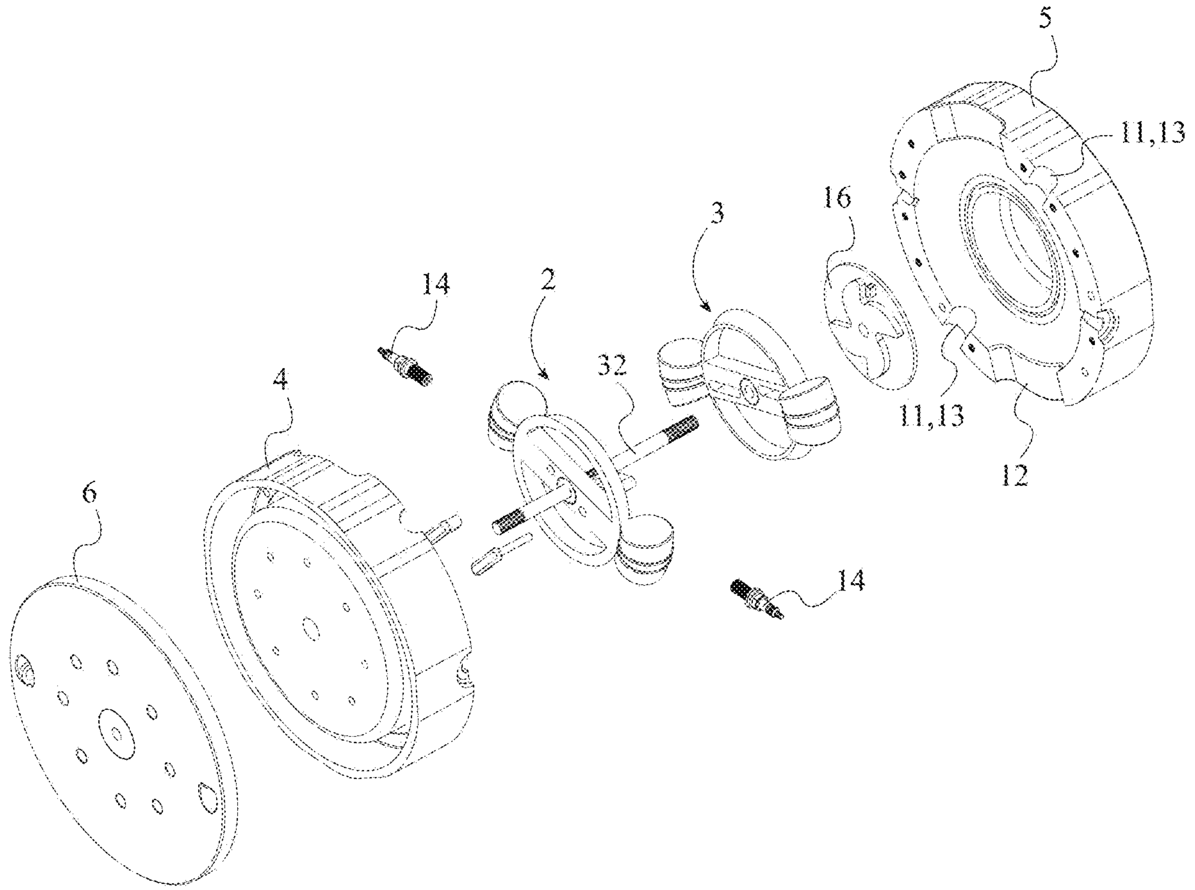
FIG. 10 is an exploded perspective view of an alternative embodiment of the present invention.
Figure 11:
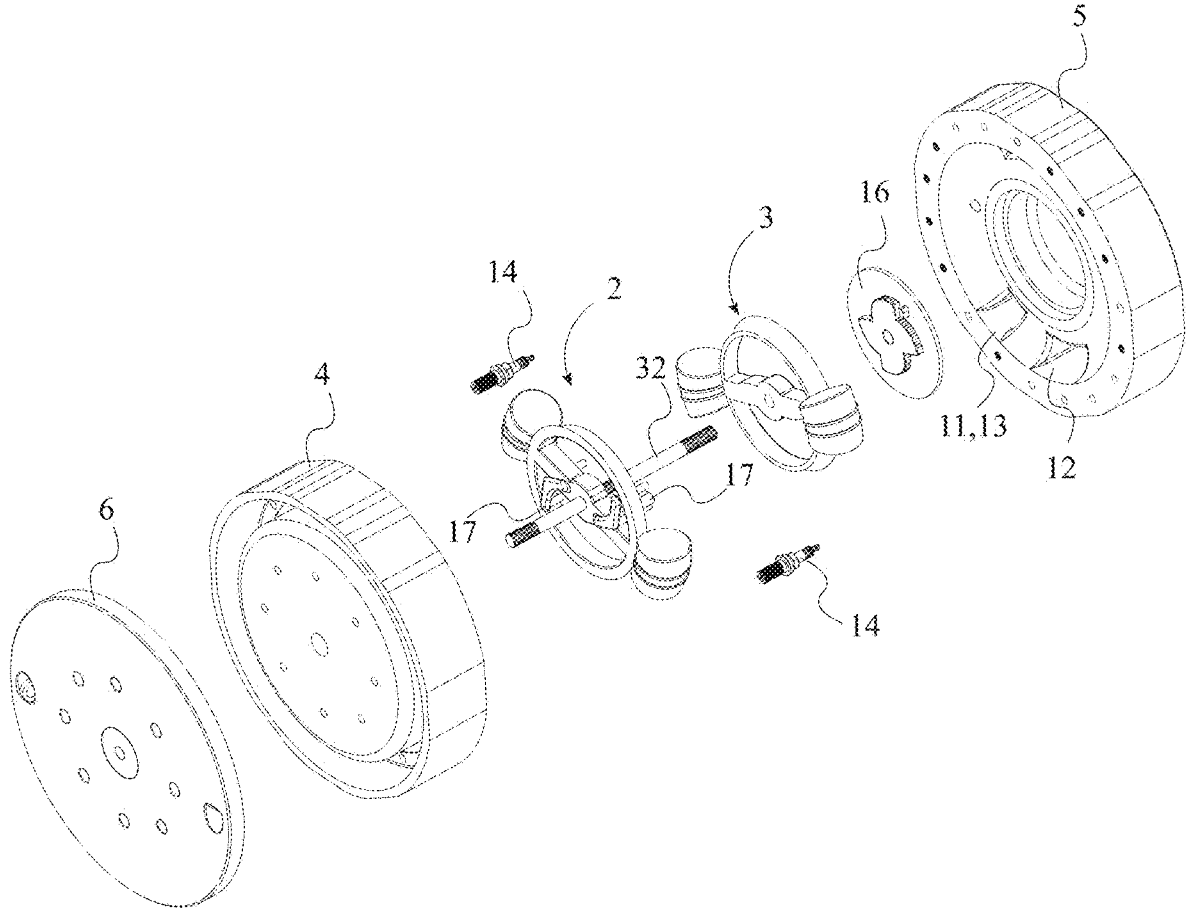
FIG. 11 is an exploded perspective view of an alternative embodiment of the present invention.

Multiple power and compression pairs can be designed into the engine. These are the basics for the engine. The power piston 2 and compression piston 3 can be designed round or square or anything in-between. A basic design includes the power piston 2 and compression piston 3 for robustness. In an alternative embodiment, the cam 16 has a guide member 161 with different widths and depths that enables the plurality of followers 17 to have different paths on one cam 16. Within the preferred embodiment the plurality of followers 17 move along the guide member 161 controlling the distance between the power piston 2 and compression piston 3 for optimal performance. A second cam on the opposite side of the engine casting can be used for more robust adjustments of the connecting rod 32. The engine casting comprises a gear housing front 4, a gear housing rear 5 and a front cover 6. A lobe cam, slotless or a dual slot cam can be utilized by the present invention in an alternative embodiment as seen in FIG. 10 and FIG. 11. The lobe cam utilizes a cam 16 with a guiding member which is a ledge, lip, protrusion or ridge that guides the plurality of followers 17 around the cam 16. This design enables the present invention to control the distance between the power piston 2 and compression piston 3 for optimal performance without a slot. The slotless cam enables the following member 17 to move around the guide member 161 with the bottom end 172. The top end 171 is coupled to the power piston 2 via a hole within the power piston 2 and a middle end extends in the same direction as the top end 171 and bottom end 172. The middle end is coupled to the compression piston 3 but is not confined or linked to a slot or hole.

Although the invention has been explained in relation to its preferred embodiment, it is to be understood that many other possible modifications and variations can be made without departing from the spirit and scope of the invention as hereinafter claimed.

What is claimed is:

1. A cam following system for pursing piston engine comprising:

a ring chamber;

a power piston;

a compression piston;

the ring chamber comprising a plurality of air inlets, a plurality of exhausts, a plurality of fuel introductions, a plurality of ignition sparks, a cam, and a plurality of followers;

the power piston comprising a power ring and a power rod;

the compression piston comprising a plurality of slots, a connecting rod, a compression arm, and a compression ring;

the power piston and compression piston being fitted within the ring chamber;

the power piston and compression piston rotating in a circular motion around the connecting rod wherein the power piston is secured to the connecting rod;

the power piston mechanically coupling to the compression piston;

the compression piston compressing a fuel mixture within the ring chamber; and the plurality of ignition sparks igniting the compressed fuel mixture within the ring chamber.

2. The cam following system for pursing piston engine as claimed in claim 1 comprising:

the plurality of ring air inlets feeding air into the ring chamber in-between the power piston and compression piston;

the plurality of fuel introductions feeding fuel into the ring chamber in-between the power piston and compression piston;

the air and fuel forming a fuel mixture within the ring chamber; and the plurality of ring air inlets and plurality of fuel introductions integrating along the outer circumference of the ring chamber.

3. The cam following system for pursing piston engine as claimed in claim 2 comprising:

the plurality of ignition sparks igniting the fuel mixture within the ring chamber;

the fuel mixture rotates the power piston;

the fuel mixture exiting the ring chamber at the plurality of exhausts; and the plurality of ignition sparks and the plurality of exhausts integrating along the outer circumference of the ring chamber.

4. The cam following system for pursing piston engine as claimed in claim 1 comprising:
the cam maintaining proper distance between the power piston and compression piston throughout the engine firing; and
the cam further comprising a guide member.

5. The cam following system for pursing piston engine as claimed in claim 4 comprising:
the plurality of followers mechanically coupling the power piston and compression piston to the cam;
the plurality of followers comprising a top end and a bottom end;
the top end being pivotally pinned to the power piston;
the bottom end being mechanically coupled to the cam; and
the bottom end traversing through the guide member configuration along the cam.

6. The cam following system for pursing piston engine as claimed in claim 1 comprising:
the power ring forming a circular shape that fits within the ring chamber; and
the power arm connecting one end of the power piston to the other end.

7. The cam following system for pursing piston engine as claimed in claim 6 comprising:
the compression ring forming a circular shape that fits within the ring chamber;
the compression arm connecting one end of the compression piston to the other end; and
the power ring receiving the compression ring.

8. The cam following system for pursing piston engine as claimed in claim 7 comprising:
the connecting rod traversing through the compression arm through the power arm;
the plurality of slots integrating along the compression arm;
the plurality of followers traversing through the plurality of slots; and
the plurality of slots constraining the movement of the plurality of followers.

9. A cam following system for pursing piston engine comprising:
a ring chamber;
a power piston;
a compression piston;
the ring chamber comprising a plurality of air inlets, a plurality of exhausts, a plurality of fuel introductions, a plurality of ignition sparks, a cam, and a plurality of followers;
the power piston comprising a power ring and a power rod;
the compression piston comprising a plurality of slots, a connecting rod, a compression arm, and a compression ring;
the power piston and compression piston being fitted within the ring chamber;
the power piston and compression piston rotating in a circular motion around the connecting rod wherein the power piston is secured to the connecting rod;
the power piston mechanically coupling to the compression piston;
the compression piston compressing a fuel mixture within the ring chamber;
the plurality of ignition sparks igniting the compressed fuel mixture within the ring chamber;
the cam maintaining proper distance between the power piston and compression piston throughout the engine firing; and
the cam further comprising a guide member.

10. The cam following system for pursing piston engine as claimed in claim 9 comprising:
the plurality of ignition sparks igniting the fuel mixture within the ring chamber;
the fuel mixture rotates the power piston;
the fuel mixture exiting the ring chamber at the plurality of exhausts; and
the plurality of ignition sparks and the plurality of exhausts integrating along the outer circumference of the ring chamber.

11. The cam following system for pursing piston engine as claimed in claim 9 comprising:
the plurality of ring air inlets feeding air into the ring chamber in-between the power piston and compression piston;
the plurality of fuel introductions feeding fuel into the ring chamber in-between the power piston and compression piston;
the air and fuel forming a fuel mixture within the ring chamber; and
the plurality of ring air inlets and plurality of fuel introductions integrating along the outer circumference of the ring chamber.

12. The cam following system for pursing piston engine as claimed in claim 9 comprising:
the plurality of followers mechanically coupling the power piston and compression piston to the cam;
the plurality of followers comprising a top end and a bottom end;
the top end being pivotally pinned to the power piston;
the bottom end being mechanically coupled to the cam; and
the bottom end traversing through the guide member configuration along the cam.

13. The cam following system for pursing piston engine as claimed in claim 9 comprising:
the power ring forming a circular shape that fits within the ring chamber; and
the power arm connecting one end of the power piston to the other end.

14. The cam following system for pursing piston engine as claimed in claim 13 comprising:
the compression ring forming a circular shape that fits within the ring chamber;
the compression arm connecting one end of the compression piston to the other end; and
the power ring receiving the compression ring.

15. The cam following system for pursing piston engine as claimed in claim 14 comprising:
the connecting rod traversing through the compression arm through the power arm;
the plurality of slots integrating along the compression arm;
the plurality of followers traversing through the plurality of slots; and
the plurality of slots constraining the movement of the plurality of followers.

16. A cam following system for pursing piston engine comprising:
a ring chamber;
a power piston;

a compression piston;

the ring chamber comprising a plurality of air inlets, a plurality of exhausts, a plurality of fuel introductions, a plurality of ignition sparks, a cam, and a plurality of followers;

the power piston comprising a power ring and a power rod;

the compression piston comprising a plurality of slots, a connecting rod, a compression arm, and a compression ring;

the power piston and compression piston being fitted within the ring chamber;

the power piston and compression piston rotating in a circular motion around the connecting rod wherein the power piston is secured to the connecting rod;

the power piston mechanically coupling to the compression piston;

the compression piston compressing a fuel mixture within the ring chamber;

the plurality of ignition sparks igniting the compressed fuel mixture within the ring chamber;

the plurality of ring air inlets feeding air into the ring chamber in-between the power piston and compression piston;

the plurality of fuel introductions feeding fuel into the ring chamber in-between the power piston and compression piston;

the air and fuel forming a fuel mixture within the ring chamber;

the plurality of ring air inlets and plurality of fuel introductions integrating along the outer circumference of the ring chamber;

the plurality of ignition sparks igniting the fuel mixture within the ring chamber;

the fuel mixture rotates the power piston;

the fuel mixture exiting the ring chamber at the plurality of exhausts; and the plurality of ignition sparks and the plurality of exhausts integrating along the outer circumference of the ring chamber.

17. The cam following system for pursing piston engine as claimed in claim 16 comprising:

the cam maintaining proper distance between the power piston and compression piston throughout the engine firing; and the cam further comprising a guide member.

18. The cam following system for pursing piston engine as claimed in claim 17 comprising:

the plurality of followers mechanically coupling the power piston and compression piston to the cam;

the plurality of followers comprising a top end and a bottom end;

the top end being pivotally pinned to the power piston;

the bottom end being mechanically coupled to the cam; and the bottom end traversing through the guide member configuration along the cam.

19. The cam following system for pursing piston engine as claimed in claim 16 comprising:

the power ring forming a circular shape that fits within the ring chamber; and the power arm connecting one end of the power piston to the other end.

20. The cam following system for pursing piston engine as claimed in claim 19 comprising:

the compression ring forming a circular shape that fits within the ring chamber;

the compression arm connecting one end of the compression piston to the other end;

the power ring receiving the compression ring;

the connecting rod traversing through the compression arm through the power arm;

the plurality of slots integrating along the compression arm;

the plurality of followers traversing through the plurality of slots; and the plurality of slots constraining the movement of the plurality of followers.

* * * * *